United States Patent
Banerjee et al.

(10) Patent No.: US 7,822,026 B2
(45) Date of Patent: Oct. 26, 2010

(54) TRANSIT DEVICES AND SYSTEM INCLUDING A SLOW PROTOCOL FILTER AND METHODS OF TRANSMITTING INFORMATION WITHIN A TRANSIT DEVICE OR SYSTEM USING A SLOW PROTOCOL FILTER

(75) Inventors: Saibal Banerjee, San Jose, CA (US); Alexander Tom, San Jose, CA (US)

(73) Assignee: Allied Telesis, Inc., San Jose, CA (US)

( * ) Notice: Subject to any disclaimer, the term of this patent is extended or adjusted under 35 U.S.C. 154(b) by 539 days.

(21) Appl. No.: 11/300,597

(22) Filed: Dec. 15, 2005

(65) Prior Publication Data
US 2007/0140132 A1    Jun. 21, 2007

(51) Int. Cl.
*H04L 12/28* (2006.01)
*H04L 12/56* (2006.01)

(52) U.S. Cl. ............................ 370/389; 370/401
(58) Field of Classification Search ............... 370/389, 370/392, 400, 401
See application file for complete search history.

(56) References Cited

U.S. PATENT DOCUMENTS

| | | | | |
|---|---|---|---|---|
| 5,883,890 | A * | 3/1999 | Okanoue et al. | 370/338 |
| 6,317,429 | B1 * | 11/2001 | Nakata et al. | 370/360 |
| 6,646,546 | B1 * | 11/2003 | Butler et al. | 370/276 |
| 7,174,393 | B2 * | 2/2007 | Boucher et al. | 709/250 |
| 7,191,241 | B2 * | 3/2007 | Boucher et al. | 709/230 |
| 7,197,008 | B1 * | 3/2007 | Shabtay et al. | 370/218 |
| 7,251,215 | B1 * | 7/2007 | Turner et al. | 370/231 |
| 2003/0026267 | A1 * | 2/2003 | Oberman et al. | 370/397 |
| 2005/0099949 | A1 * | 5/2005 | Mohan et al. | 370/236.2 |
| 2006/0203827 | A1 * | 9/2006 | Absillis | 370/395.54 |
| 2006/0239183 | A1 * | 10/2006 | Robitaille et al. | 370/217 |

* cited by examiner

*Primary Examiner*—Hong Cho
(74) *Attorney, Agent, or Firm*—Arent Fox LLP

(57) ABSTRACT

A transit device and system that include a first link configured to receive a plurality of packets, and a second link communicatively coupled to the first link via a slow protocol filter. The plurality of packets include a first type of packet (e.g., data packets) and a second type of packet (e.g., slow protocol control packets). The transit device also includes a slow protocol filter that couples the first link to the second link, with the slow protocol filter being coupled to a local slow protocol client (e.g., local host CPU). Moreover, the slow protocol filter is configured to receive the plurality of packets from the first link, and to determine whether each of the plurality of packets is of the first type or the second type. The slow protocol filter also is configured to transmit each of the plurality of packets that are of the first type to the second link, and to transmit each of the plurality of packets that are the second type to the local slow protocol client. The slow protocol filter is also configured to transmit packets of second type sourced by the local slow protocol client (local host CPU) to either the first or the second link based on the destination address. Thus slow protocol filter offers data path between two remote peers and the local host for exchange of commands and responses.

19 Claims, 3 Drawing Sheets

TRANSIT DEVICES AND SYSTEM INCLUDING A SLOW PROTOCOL FILTER AND METHODS OF TRANSMITTING INFORMATION WITHIN A TRANSIT DEVICE OR SYSTEM USING A SLOW PROTOCOL FILTER

BACKGROUND OF THE INVENTION

1. Field of the Invention

The present invention relates generally to transit devices that include a slow protocol filter, and methods of transmitting information within a transit device between two high bit rate data links and a slow control link using a slow protocol filter. In particular, the present invention is directed towards transit devices and methods in which a first data link receives packets, and the slow protocol filter determines whether the packets are data packets or are slow protocol control packets, and the packets are forwarded to the second data link or to a slow protocol client, connected to the slow control link, depending on whether the packets are data packets or slow protocol control packets.

2. Description of Related Art

The advantages of network communication are increasingly evident. The convenience and efficiency of providing information, communication, or distributed computational power to individuals at their personal computers or other end user devices has led to rapid growth of such networks.

Today's network traffic often consists of secured transactions between financial institutions, distributed global corporations, research and defense installations. This requires high reliability links to be established over the network by means of a Slow Protocol control operating between end stations and intermediate stations that can quickly diagnose link failure and administer corrective actions.

Most network communication is accomplished with the aid of a layered software architecture for moving information among host computers connected to the network. The layers help to create a task hierarchy, and the general functions of each layer is often based on an international standard called the Open Systems Interconnection ("OSI"). OSI sets forth seven processing layers through which information may pass when received by a host, in order to be presentable to an end user. Similarly, information from a host to the network may pass through those seven processing layers in reverse order. Another reference model that is widely implemented, called transport control protocol/internet protocol ("TCP/IP"), essentially employs five of the seven layers of OSI.

At the Physical level networks may include, for instance, a high-speed bus such as an Ethernet connection or an Internet connection between disparate local area networks ("LANs"), each of which includes multiple hosts, or any of a variety of other known means for data transfers among hosts. According to the OSI standard, physical layers are connected to the network at respective hosts, with the physical layers providing transmission and receipt of raw data bits via the network. The rules governing each layer are collectively termed as the "protocol" of that layer. In networking, Media Access Control ("MAC") constitutes the Data Link Layer or Layer 2 of the OSI model.

As network needs grow progressively complex some of the layers such as the MAC layer are getting further refined to include sub-layers to cater to the high availability and high reliability demands on the link. One such sub-layer "Operation Administration and Maintenance (OAM)" in order to control various aspects of operation of terminal devices at the Data Link layer defines a class of control protocols known as "slow protocols" supportable by software implementing the protocol on a microprocessor and have minimal impact on bandwidth consumed provided the slow protocol frames can be identified and forwarded to the microprocessor. However, no such mechanism has yet been defined for intermediate transit devices.

SUMMARY OF THE INVENTION

Therefore, a need has arisen for systems and methods for implementing slow control protocols operating between a transit device and its link partners. The present invention addresses this need by defining a slow protocol filter for a transit device, such as a media converter, that segregates slow protocol packets exchanged between the transit device and its link partners. A transit device has two or more communicatively coupled data links and it is generally configured to receive a plurality of packets on the first link and forward those to the second link and vice versa. The plurality of packets received on a data link, include a first type of packet (e.g., data packets) and a second type of packet (e.g., slow protocol control packets). The transit device includes a slow protocol filter between the first link and the second link, with the slow protocol filter being coupled to a local slow protocol client. Moreover, the slow protocol filter is configured to receive the plurality of packets from the first link, and to determine whether each of the plurality of packets is the first type of packet or the second type of packet. The slow protocol filter also is configured to transmit each of the plurality of packets that are the first type of packet to the second link, and to transmit each of the plurality of packets that are the second type of packet to the local slow protocol client.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Figure 1:
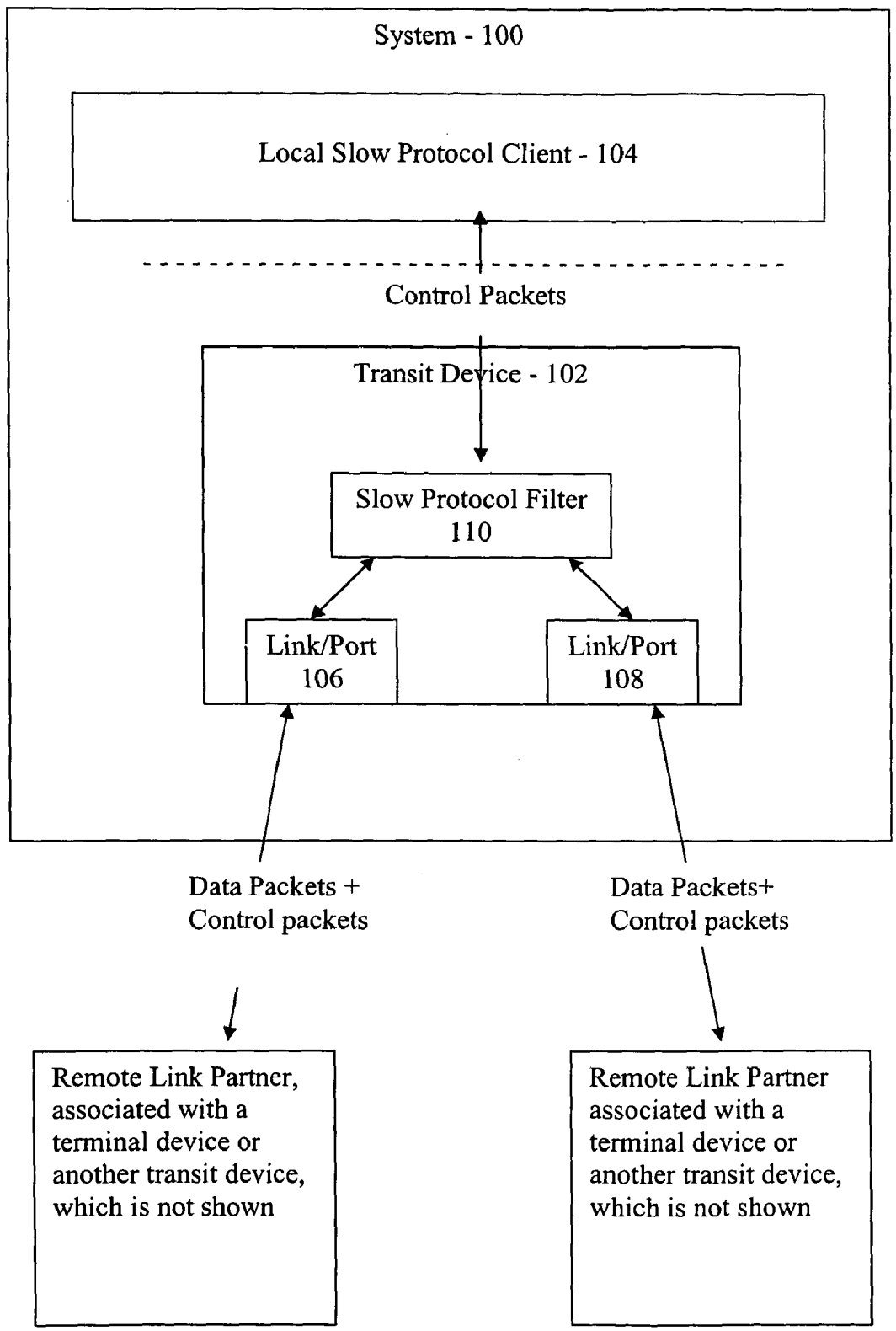
FIG. 1 is a schematic diagram of a system that includes a transit device, in which the transit device includes a slow protocol filter, according to an embodiment of the present invention.
Figure 2:
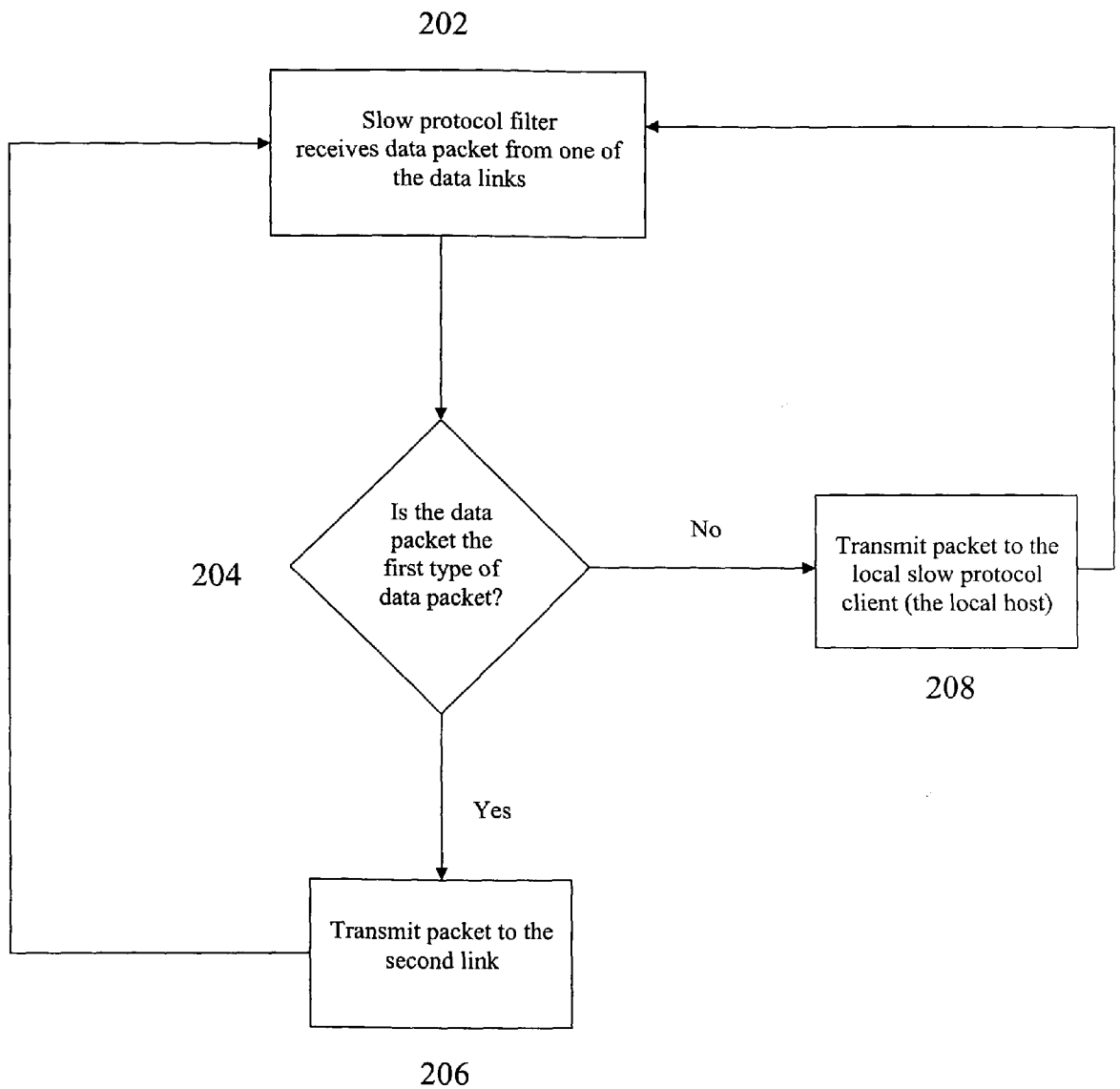
FIG. 2 is a flow-chart of a method for transmitting information within a transit device that includes a slow protocol filter, according to an embodiment of the present invention.

Preferred embodiments of the present invention and their features and advantages may be understood by referring to FIGS. 1 and 2, like numerals being used for like corresponding parts in the various drawings.

Referring to FIG. 1, a system 100, in accordance with an exemplary embodiment of the present invention, may comprise a transit device 102 (e.g., an Ethernet device such as a 10 Mbps Ethernet device, a 100 Mpbs Fast Ethernet device, a Gigabit Ethernet device, or a 10 Gigabit Ethernet media converter) such as a line card, and a slow protocol client 104, such as a central processing unit (CPU). The transit device 102 may comprise a first link (port) 106 and a second link (port) 108. For example, the first link 106 and the second link 108 each may include a fiber port, a copper port, or the like. The transit device 102 also may comprise a slow protocol filter 110 (e.g., an OAM filter) that is coupled to each of the first link 106 and the second link 108, such that the slow protocol filter 110 communicatively couples the first link 106 to the second link 108, and vice versa. The slow protocol filter 110 also is coupled to the local slow protocol client 104. The slow protocol filter may be implemented inexpensively, for example, on a standard cell ASIC/FPGA (Application Specific Integrated Circuit/Field Programmable Gate Array) with technology determined by the link speed of the application. A hardware implementation of the slow protocol filter enables it to handle high bit rate traffic. Therefore, the scheme is suitable for a broad spectrum of transit devices; even those handling high bit rate e.g. 1 Gbps and 10 Gbps Ethernet Media Converters—where a software-based filter might be overwhelmed, due to its inherent slowness.

In operation, the first link 106 may receive a plurality of packets from another device in the system 100, and these packets may comprise a first type of packet and a second type of packet. For example, the first type of packet may comprise a data packet, and the second type of packet may comprise a slow protocol control packet, such as an Operation Administration and Maintenance ("OAM") packet. Slow Protocols Requirements are specified in IEEE802.3-2002 Annex 43B, copyright © 2002 by the Institute of Electrical and Electronic Engineers (IEEE), the disclosure of which is incorporated herein in its entirety. OAM is a slow protocol in the MAC sub layer. OAM is specified in IEEE802.3ah, copyright © 2004 by the Institute of Electrical and Electronic Engineers (IEEE) the disclosure of which is incorporated herein by reference in its entirety. The first link 106 forwards all received packets to the slow protocol filter 110, and the slow protocol filter 110 may determine whether each of the plurality of packets is the first type of packet or the second type of packet. For example, each of the plurality of packets may comprise a header portion, and the slow protocol filter 110 may determine whether each of the plurality of packets is of the first type or the second type by reading and parsing the header field of the packet.

After the slow protocol filter 110 determines whether a packet is of the first type or the second type, the slow protocol filter 110 transmits the packet to either the second link 108 or the local slow protocol client 104 depending on whether the packet is of the first type or the second type, respectively. Specifically, if the packet is of the first type, the slow protocol filter transmits the packet to the second link 108, and if the packet is of the second type, the slow protocol filter transmits the packet to the local slow protocol client 104.

An example of a slow protocol packet is OAM. OAM is typically meant for remote in-band MAC level link management. While IEEE802.3ah describes OAM for a layer-2 terminal device, the slow protocol filter allows OAM to be suitably extended over a transit device, such as a media converter, rather than being limited to terminal devices.

In addition to parsing and forwarding the second type of packet to the local slow protocol client, the slow protocol filter also may multicast slow protocol control packets originating from the local slow protocol client, and may forward those packets to the first link or the second link, based on destination address.

Referring to FIG. 2, a flow chart of a method 200 for transmitting information within a transit device that includes a slow protocol filter in accordance with one exemplary embodiment of the present invention, is depicted. In 202, the slow protocol filter receives a plurality of packets from the first link. In 204, the slow protocol filter determines whether each of the plurality of packets is the first type of packet or the second type of packet. In 206, the slow protocol filter transmits each of the plurality of packets that are the first type of packet to the second link, and in 208, the slow protocol filter transmits each of the plurality of packets that are the second type of packet to the local slow protocol client.

Figure 3:
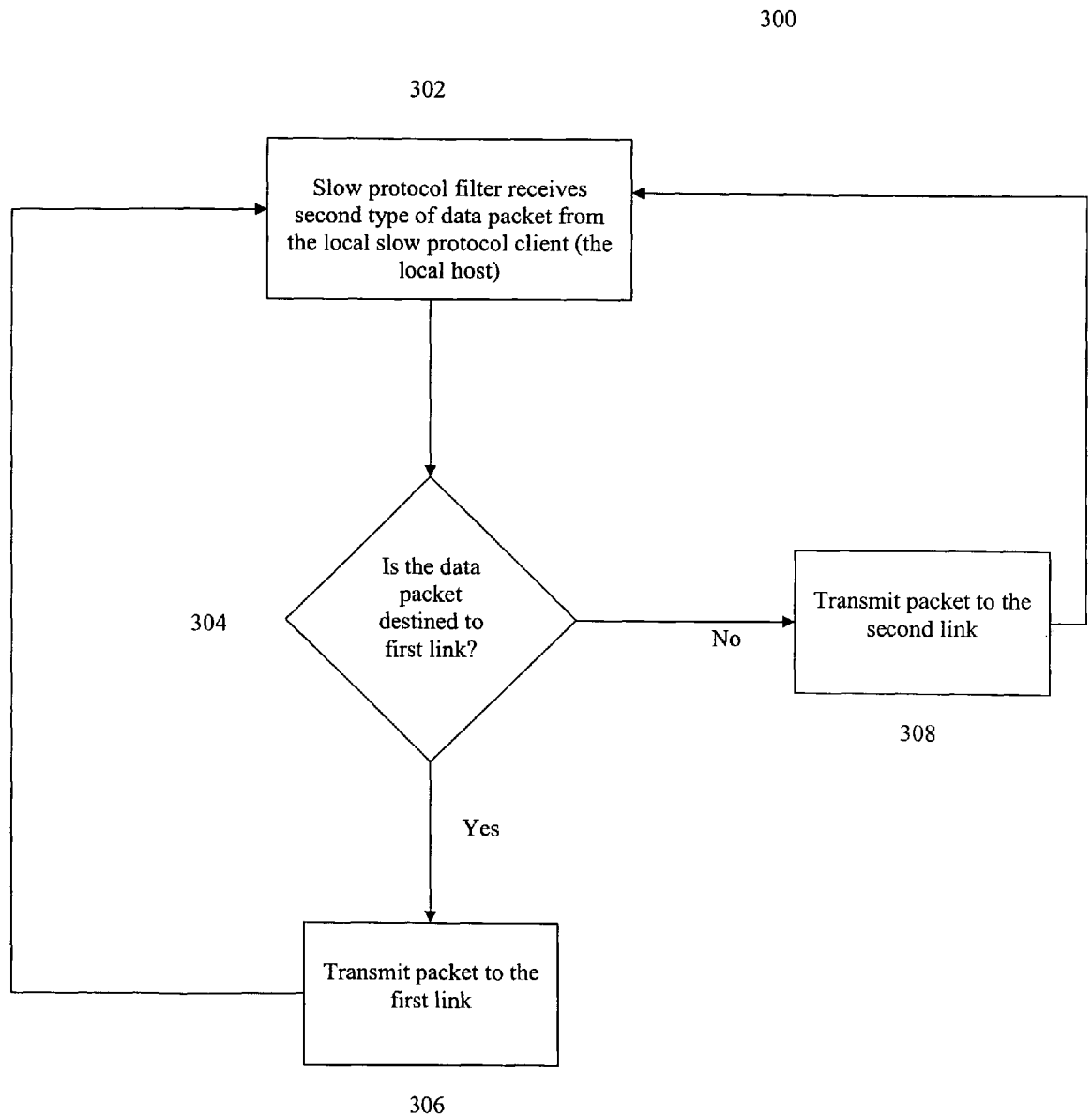
FIG. 3 is a flow-chart of a method for transmitting information within a transit device that includes a slow protocol filter according to an embodiment of the invention.

Referring to FIG. 3, a flow-chart of a method 300 for transmitting information within a transit device that includes a slow protocol filter in accordance with one exemplary embodiment of the present invention, is depicted. In 302, the slow protocol filter receives second type of packet from the local slow protocol client (the local host CPU). In 304, the slow protocol filter determines whether the packet is destined to the first link or the second link based on the destination address found in the header field of the packet. In 306, the slow protocol filter transmits to the first link each of the plurality of packets that are destined to the first link. In 307, the slow protocol filter transmits to the second link each of the plurality of packets that are destined to the second link.

In addition, the slow protocol filter may receive and implement parameter changes originating from the local slow protocol client. One example of a parameter change that the local slow protocol client may request is a loop back.

A loop back may be directed by remote data terminal equipment "DTE" through the slow protocol client (e.g. a CPU). The DTE requests a configuration to be set on the slow protocol filter to create a MAC level loop back towards the requesting DTE. This loop back can be used by the requesting DTE for diagnostic purposes while the slow protocol filter sends PAUSE frame towards the remote DTE on the other link to stop normal traffic between the data ports, during the loop back period.

During transmission of control traffic consisting of Protocol Data Unit "PDU" originating from the slow protocol client to one of the data links connected to the transit device the slow protocol filter sends PAUSE frames to the other data link. This function temporarily prevents normal transit traffic activity while control packets are being transmitted to one of the data links.

Remote loop back capability is one typical feature of OAM diagnostics. The loop back capability of the slow protocol filter on each link directly correlates to the ability to implement OAM on the transit device. One function of the OAM slow protocol is to allow remote failure indication to indicate, for example, to a peer that the receive path of the local DTE is non-operational. Yet another function of OAM is to allow for link monitoring, including event notification comprising diagnostic information, MAC level ping, and the like.

Each of these functions and others may be achieved with the help of OAM PDU transfers among OAM enabled end stations. A media converter generally is a forwarding device for general packets. An OAM enabled media converter, an exemplary embodiment of the present invention, does not forward OAM PDUs addressed to the local client, but it rather terminates those PDUs locally and passes the PDUs on to the OAM client (the slow protocol client) via the slow protocol filter.

OAM remote loop back can be used for fault localization and link performance testing. The OAM protocol operates between two slow protocol clients residing on link partners at two ends of a link. Each is considered a "remote peer" to the other with respect to OAM traffic. Each can send an OAMP-DU.request packet to the other and each can respond to such a request by returning an OAMPDU.indication packet. Here, "remote peer" is specifically the remote CPU which consumes and sources the OAM frames. Whereas, the "remote link partner" is a device (e.g., a line card) connected at the other end of the link who can converse with the local station using a link protocol. The remote device may be either a terminal device or a transit device. The remote link partner may incorporate a remote peer, or remote CPU. The local slow protocol client or local slow protocol host is the local CPU. The CPU is referred to as a "client" when it is receiving the OAM frames. It is referred to as the local "host" when it is the source of the OAM frames. One implementation may analyze loop back frames within the OAM sub layer to determine additional information about the health of the link involved in the loop back. In one embodiment, in accordance with IEEE Draft P802.3ah, the interlayer service interface between the slow protocol filter and the slow protocol client consists of remote and local communication channels. The remote channels allow passage of OAM PDU from remote peer to local OAM client and vice versa, via the slow protocol filter while the local channels allow passage of control information between the OAM client and the slow protocol filter. The channel mapping in accordance to IEEE 802.3ah is as follows:

| OAM Channel | Description | SPF-T Channel Mapping |
|---|---|---|
| OAMPDU.request | OAMPDU from local slow protocol client to the remote peer. | OAM PDU path within slow protocol filter from local client to the link. |
| OAMPDU.indication | OAMPDU from remote peer to the local slow protocol client | OAM PDU path within slow protocol filter from link to the local client |
| OAM_CTL.request | Control information from slow protocol client to local OAM sub layer | Control path from slow protocol client (which is the local host) to the slow protocol filter, used to configure sub-layer parameters by the local host |
| OAM_CTL.indication | Control information from the local OAM sub layer to the slow protocol client | Information path from slow protocol filter to the slow protocol client (which is the local host), used to report sub-layer configuration to the local host. |

Based on an OAMPDU.request from a remote peer through a link, the slow protocol client can issue OAM_CTL.request to the slow protocol filter to set appropriate MAC sub layer parameters responsible for enabling MAC level loop back on the relevant link. During such a loop back on one link, the slow protocol filter may transmit a PAUSE frame to the other link to hold off normal through traffic of the media converter. The link involved in the loop back will return all non OAM PDU data packets received from the remote peer while still forwarding the OAMPDU packets to the local slow protocol client.

While the above communication channels are implemented on the slow protocol filter, the software is responsible for implementing a set of verbs, or service primitives, associated with each of the above channels, per IEEE draft 802.3ah.

Another sub-layer parameter change that may optionally be implemented on the slow protocol filter is OAM DTE "active" or "passive" by the slow protocol client (the local host). If this feature is set to an "active" status, the software functions so as to ensure proper operation of the OAM discovery process, which involves essentially OAM level auto negotiation in order to resolve the existence and capabilities of a remote OAM host.

Using the slow protocol filter increases the filtering efficiency by dividing the task between the hardware block and the software. The hardware filters the slow protocol packets from the flow of packets of data which allows the software to operate by receiving and transmitting only the slow protocol packets of data.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. A transit device, comprising:
a first link configured to receive a plurality of packets, wherein the plurality of packets include a first type of packet and a second type of packet;
a second link communicatively coupled to the first link; and
a slow protocol filter communicatively coupled to the first link and the second link;
wherein the slow protocol filter is communicatively coupled to a local slow protocol client,
wherein the slow protocol filter is configured to receive the plurality of packets from the first link, to determine whether each of the plurality of packets is the first type of packet or the second type of packet, to transmit each of the plurality of packets that are the first type of packet to the second link, and to transmit each of the plurality of packets that are the second type of packet to the local slow protocol client;
wherein the slow protocol filter is configured to establish a loop back to the at least a first one of the first link and the second link upon request from a remote link partner and wherein the loop back comprises the at least a first one of the first link and the second link being configured to return data packets of a particular type which are sent from the remote partner on that link; and
wherein the slow protocol filter is configured to send a PAUSE frame to a second one of the first link and the second link to temporarily stop normal through traffic between first and second link during the loop back.

2. The transit device of claim 1, wherein the first type of packet comprises a data packet, and wherein the second type of packet comprises a slow protocol control packet.

3. The transit device of claim 2, wherein the slow protocol control packet comprises an operation administration and maintenance packet.

4. The transit device of claim 1, wherein the transit device comprises a line card.

5. The slow protocol filter of claim 1, wherein the slow protocol filter comprises one of an Application Specific Integrated Circuit or a Field Programmable Gate Array.

6. The transit device of claim 1, wherein the first link is selected from a group consisting of a fiber port and a copper port, and wherein the second link is selected from a group consisting of a fiber port and a copper port.

7. The transit device of claim 1, wherein each of the plurality of packets comprises a header portion, and wherein the slow protocol filter determines whether each of the plurality of packets is the first type of packet or the second type of packet by reading the header portion.

8. The transit device of claim 1, wherein the transit device is an Ethernet device.

9. The transit device of claim 8, wherein the Ethernet device is a gigabit Ethernet device.

10. The transit device of claim 8, wherein the Ethernet device is one of a 10 Mbps Ethernet device, a 100 Mbps Fast Ethernet device, a Gigabit Ethernet device and a 10 Gbps Ethernet device.

11. The transit device of claim 1, wherein the local slow protocol client is a Central-Processing Unit (CPU).

12. The transit device of claim 1, wherein the slow protocol filter is a Media Access Control layer-2 filter.

13. The transit device of claim 1, wherein the data packets of a particular type comprise all non OAM PDU packets.

14. The transit device of claim 1, wherein the slow protocol filter is further configured to transmit packets of data from the local slow protocol client to a first one of the first link and the second link and to send a PAUSE frame to a second one of the first link and the second link to temporarily stop normal through traffic between first and second link during the transmission of the data packets from the local slow protocol client.

15. A system for transmitting packets of information, comprising:
 a local slow protocol client; and
 a transit device communicatively coupled to the local slow protocol client, wherein the transit device includes:
  a first link configured to receive a plurality of packets, wherein the plurality of packets comprise a first type of packet and a second type of packet;
  a second link communicatively coupled to the first link; and
  a slow protocol filter that communicatively couples the first link to the second link;
  wherein the slow protocol filter is communicatively coupled to the local slow protocol client;
  wherein the slow protocol filter is configured to receive the plurality of packets from the first link, to determine whether each of the plurality of packets is the first type of packet or the second type of packet, to transmit each of the plurality of packets that are the first type of packet to the second link, and to transmit each of the plurality of packets that are the second type of packet to the local slow protocol client;
  wherein the slow protocol filter is configured to establish a loop back to the at least a first one of the first link and the second link upon request from a remote link partner and wherein the loop back comprises the at least a first one of the first link and the second link being configured to return data packets of a particular type which are sent from the remote partner on that link; and
  wherein the slow protocol filter is configured to send a PAUSE frame to a second one of the first link and the second link to temporarily stop normal through traffic between first and second link during the loop back.

16. A method of transmitting packets of information within a transit device, wherein the transit device comprises a first link configured to receive a plurality of packets, the plurality of packets comprising a first type of packet and a second type of packet, a second link communicatively coupled to the first link, and a slow protocol filter communicatively coupled to the first link and the second link, wherein the slow protocol filter is communicatively coupled to a local slow protocol client, the method comprising:
 receiving the plurality of packets from the first link;
 determining whether each of the plurality of packets is the first type of packet or the second type of packet;
 transmitting each of the plurality of packets that are the first type of packet to the second link;
 transmitting each of the plurality of packets that are the second type of packet to the local slow protocol client;
 establishing a loop back to at least a first one of the first link and the second link upon request from a remote link partner establishing the loop back including configuring at least a first one of the first link and the second link to return data packets of a particular type which are sent from the remote partner on that link; and
 sending a PAUSE frame to a second one of the first link and the second link to temporarily stop transmission on that link during the loop back, wherein the loop includes at least a first one of the first link and the second link being configured to return data packets of a particular type which are sent from the remote partner on that link.

17. The method of claim 16, wherein the first type of packet comprises a data packet, and wherein the second type of packet comprises a slow protocol control packet.

18. The method of claim 16, further comprising:
 transmitting packets of data from the local slow protocol client to a first one of the first link and the second link; and
 sending a PAUSE frame to a second one of the first link and the second link to temporarily stop normal through traffic between first and second link during transmission of the data packets from the local slow protocol client.

19. A processing system for transmitting packets of information within a transit device, the transit device including a first link configured to receive a plurality of packets, wherein the plurality of packets comprise a first type of packet and a second type of packet; a second link communicatively coupled to the first link; and a slow protocol filter communicatively coupled to the first link and the second link, the slow protocol filter being communicatively coupled to a local slow protocol client; the processing system being operable to:
 discover a slow protocol capable device coupled to one of the first link and the second link, wherein the slow protocol capable device includes a slow protocol capable remote peer;
 receive at least one slow protocol packet from the slow protocol capable remote peer;
 receive the plurality of packets from the first link, determine whether each of the plurality of packets is the first type of packet or the second type of packet, transmit each of the plurality of packets that are the first type of packet to the second link, and transmit each of the plurality of packets that are the second type of packet to the local slow protocol client; and send at least one slow protocol packet to the remote peer;

establish a loop back to at least a first one of the first link and the second link upon request from a remote link partner establishing the loop back including configuring at least a first one of the first link and the second link to return data packets of a particular type which are sent from the remote partner on that link; and send a PAUSE frame to a second one of the first link and the second link to temporarily stop transmission on that link during the loop back, wherein the loop includes at least a first one of the first link and the second link being configured to return data packets of a particular type which are sent from the remote partner on that link.

* * * * *